United States Patent
Matsuo et al.

(10) Patent No.: US 7,334,974 B2
(45) Date of Patent: Feb. 26, 2008

(54) COMPOSITION FOR USE AS SELF-LOCKING AGENT AND SELF-LOCKING MEMBER USING THE SAME

(75) Inventors: Satoshi Matsuo, Tokyo (JP); Hidenori Kanazawa, Tokyo (JP)

(73) Assignee: Three Bond Co. Ltd., Hachioji-shi, Tokyo (JP)

( * ) Notice: Subject to any disclaimer, the term of this patent is extended or adjusted under 35 U.S.C. 154(b) by 637 days.

(21) Appl. No.: 10/493,524

(22) PCT Filed: Oct. 25, 2002

(86) PCT No.: PCT/JP02/11101

§ 371 (c)(1),
(2), (4) Date: Apr. 23, 2004

(87) PCT Pub. No.: WO03/036105

PCT Pub. Date: May 1, 2003

(65) Prior Publication Data

US 2005/0049340 A1    Mar. 3, 2005

(30) Foreign Application Priority Data

Oct. 26, 2001  (JP) .............................. 2001-329007

(51) Int. Cl.
*F16B 39/00* (2006.01)
*C08L 77/06* (2006.01)

(52) U.S. Cl. ...................... 411/258; 411/930; 524/196; 524/501; 524/538

(58) Field of Classification Search ................ 411/258, 411/930
See application file for complete search history.

(56) References Cited

U.S. PATENT DOCUMENTS 4,362,450 A * 12/1982 Hasegawa et al. .......... 411/258
4,702,939 A    10/1987 Miyauchi et al.

FOREIGN PATENT DOCUMENTS

| | | |
|---|---|---|
| JP | 60-188609 | 9/1985 |
| JP | 5-070005 | 10/1993 |
| JP | 10-288214 | 10/1998 |

OTHER PUBLICATIONS

Machine Translation of JP 10-288214, Oct. 27, 1998.*

* cited by examiner

*Primary Examiner*—Vasu Jagannathan
*Assistant Examiner*—Vickey Ronesi
(74) *Attorney, Agent, or Firm*—Dilworth & Barrese, LLP

(57) ABSTRACT

A composition for use as a self-locking agent is provided which comprises an aqueous dispersion of the following ingredients dissolved and dispersed in water: (a) a polyamide powder insoluble or slightly soluble in water, (b) an isocyanate compound, (c) a surfactant and (d) a water-soluble polyamide. The composition permits a polyamide resin layer of a smooth surface to be formed on a screw surface of a to-be-coated member. With use of the composition, it is possible to prevent slippage and sagging of the resin layer coated on the screw surface and improve the precision in resin coating processing.

19 Claims, No Drawings

COMPOSITION FOR USE AS SELF-LOCKING AGENT AND SELF-LOCKING MEMBER USING THE SAME

FIELD OF THE INVENTION

The present invention relates to a self-locking member having a polyamide resin layer applied to a screw surface of a metallic member which has a screw portion formed of a metallic material such as iron, as well as a composition to be used as a self-locking agent in the self-locking member. More particularly, the present invention is concerned with a self-locking member comprising a metallic member having a screw surface, with the said resin being heated and melted, and/or heated and cured, on the screw surface to self-lock the metallic member, and exhibiting an adjusting function and a sealing function, as well as a composition as a self-locking agent to be used in the self-locking member. Further, the present invention is concerned with a composition as a self-locking agent suitable for a machine screw of a small diameter not larger than M4 (4 mm dia.).

PRIOR ART

Heretofore, as a self-locking member having a screw portion, there widely has been used a screw member with a thermoplastic material or the like applied or melted to the screw surface. More particularly, as is disclosed in JP 4-20093B, the applicant in the present case has already proposed a composition for use as a self-locking agent comprising a polyamide powder and an epoxy resin both dispersed in an organic solvent. Likewise, in JP 5-70005B, it is proposed to obtain a self-locking screw member by melting a self-locking agent containing a polyamide, an epoxy resin and an isocyanate compound to a screw surface of a heated screw member. Further, in JP 10-288214A, there is proposed a composition for use as a self-blocking agent comprising a dispersion of a polyamide powder, an isocyanate compound and a surfactant in water solvent.

OBJECTS OF THE INVENTION

The self-locking agent used in the invention disclosed in JP 4-20093B uses an organic solvent and therefore it is necessary to give an appropriate consideration to the environment. In the invention disclosed in JP 5-70005B, a large-scale equipment is needed because a screw or the like itself is heated at the time of adhering a powdered self-locking agent to the screw or the like. For adhering a powdered resin to a screw portion without preheating the screw itself, the use of an organic solvent or a pretreatment using a primer or the like is necessary, resulting in the working process becoming complicated.

For solving the above-mentioned problems the applicant in the present case has proposed an aqueous self-locking agent composition which is disclosed in JP 10-288214A. According to this aqueous self-locking agent composition, at the time of forming a polyamide resin layer on a screw surface, it is not necessary to perform a primer treatment or use a large-scale heating equipment, and a self-locking effect equal or superior to that obtained by using an organic solvent can be obtained while giving an appropriate consideration to the environment.

However, with respect to the aqueous self-locking agent composition disclosed in JP 10-288214A, there occurred the following problem. Due to insufficient melting of the polyamide powder in the composition when heated and melted to the surface of a screw portion of a to-be-coated member, and due to reaction and curing of the isocyanate compound on heating, concaves and convexes are apt to be formed on the surface of the polyamide resin layer.

Particularly, in the case of a machine screw having a diameter as small as M4 (4 mm dia.) or less, if concaves and convexes are formed on the surface of the self-locking layer (polyamide resin layer), the screw thread is deformed and the machine screw becomes difficult to be tightened due to a screw tightening torque, or the screw tightening torque increases and causes deformation of the slot itself formed in the screw head. Accordingly, it is an object of the present invention to form a smooth surface of a polyamide resin layer on a screw surface to a to-be-coated member, shorten the time for heating and melting, thereby improve the production efficiency, and prevent slippage and sagging of a coating resin layer to improve the precision in resin coating.

SUMMARY OF THE INVENTION

According to the present invention there are provided a composition for use as a self-locking agent comprising an aqueous dispersion which is prepared by dissolving and dispersing the following components (a) to (d) in water: (a) a water-insoluble polyamide powder, (b) an isocyanate compound, (c) a surfactant and (d) a water-soluble polyamide, as well as a self-locking member having a screw surface coated with a polyamide resin layer using the said composition.

The foregoing problems are solved by the present invention.

PREFERRED EMBODIMENTS OF THE INVENTION

The present invention will be described below in more detail.

The water-insoluble polyamide powder used as component (a) in the present invention is a power constituted by a homo- or copolyamide and which substantially remains powdered in the state of an aqueous self-locking agent composition. Preferably, there is used a polyamide powder which exhibits a percent water absorption of 5% or less in a dipped and saturated state in boiling water (100° C.).

As examples of the polyamide which constitutes the water-insoluble polyamide powder there are mentioned general-purpose polyamides, including synthetic polyamides such as 6-nylon, 6,6-nylon, 6,10-nylon, 7-nylon, 8-nylon, 9-nylon, 11-nylon, and 12-nylon, and copolymers thereof.

What should be taken into account at the time of selecting a polyamide to be used are as follows. The polyamide to be selected should be relatively lower in melting point than the decomposition temperature, should be easy to be processed without requiring any complicated heat control, should have such a degree of viscosity as does not largely change a coating shape when melted, should be adhered with an appropriate spread to a screw surface of a to-be-coated member, should have a small percent water absorption, high resistance to tear, to shock, to chemicals and to abrasion, should have a small coefficient of friction, and should have high hardness, strength and elasticity. When these points are put together, it is seen that 11-nylon and 12-nylon, or copolymers thereof, are preferred.

These polyamides are used in a powdered state, but for application to a machine screw of M4 or smaller, it is preferable to use a polyamide powder having a particle diameter of 10 μm or less, more preferably 0.5 to 7 μm. If the particle diameter exceeds 10 μm, concaves and convexes are apt to be formed on the surface of the polyamide resin layer formed on a screw surface, as noted earlier, and particularly when such a powder is applied to a machine screw, there will occur marked variations in the screwing torque, giving rise to the problem that the self-locking effect is not stable. The smaller the particle diameter, the smoother the surface and thus the better. But, as far as the particle diameter is 10 μm or less, there is no special problem in appearance. Plural polyamide powders of different particle diameters may be mixed together, or plural kinds of polyamides (e.g., 11-nylon and 12-nylon) may be used in combination.

The water-soluble polyamide used as component (d) in the present invention indicates a polymer having an amide structure as a repeating unit and capable of being present in a substantially dissolved state within the aqueous self-locking composition of the present invention. Preferably, there is used a polymer which becomes a transparent and homogeneous solution within 10 hours when placed and agitated in water of 50° C. or lower.

Such a water-soluble polymer is publicly known and available commercially. Usually there is used a polyamide having a polar group in the main chain or side chain which polar group brings about water solubility, i.e., a modified polyamide. As examples of compounds having a polar functional group to be introduced, there are mentioned tertiary amines such as aminoethylpiperazine, bisaminopropylpiperazine and α-dimethylamino ε-caprolactam, and polyalkylene glycols such a polyethylene glycol and polypropylene glycol, which are disclosed in JP 1-1166121A, as well as such commercially available products as "AQ Nylon A-90 and A-70" (products of Toray Industries, Inc.) and "Toresin" (a product of Teikoku Chemical Industries, Inc.). Plural such water-soluble polyamides may be used as a mixture. By using any of these water-soluble polyamides in combination with a water-insoluble polyamide powder, there is obtained an effect such that the polyamide powder contained in the resulting composition promotes heat-melting when heat-melted to the surface of a screw portion of a to-be-coated member, and makes the surface of a polyamide resin layer more uniform which resin layer is formed by reaction and curing with the isocyanate compound on heating.

The isocyanate compound used as component (b) in the present invention is a component useful for effective adhesion to a screw surface of a to-be-coated member such as a screw while making the most of excellent characteristics of the polyamide powder referred to above. As example of the isocyanate compound there are mentioned organic di- and tri-isocyanates such as tolylene diisocyanate (TDI), diphenylmethane diisocyanate (MDI), triphenylmethane triisocynanate (TTI), isocyanate (HMDI), hydrogenated xylene diisocyanate (H6XDI), and isophorone isocyanate (IPDI), provided no limitation is made to these compounds. It is preferable that the isocyanate compound be used in the form of a blocked isocyanate compound with its activity at room temperature lowered or vanished by masking the isocyanate group (R—N=C=O).

More specifically, the blocked isocyanate compound is a compound of the type wherein the highly reactive isocyanate group is masked with a blocking agent to ensure a stable state at room temperature, and the blocking agent is dissociated by heat treatment to reactivate the isocyanate group for utilization in a crosslinking reaction. The blocked isocyanate compound itself is well known and can be represented by the following general formula:

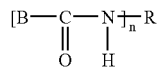

where B stands for a masking agent residue, n is an integer, preferably 2 or 3, and R is an organic group, preferably a di- or trivalent aromatic, alicyclic or aliphatic hydrocarbon group having 6 to 15 carbon atoms. As the masking agent for forming B in the above general formula there may be used any of phenols such as phenol and cresol, lactams such as ε-caprolactam, and oximes such as methyl ethyl ketoxime. By selecting a masking agent from these compounds it is possible to set a dissociation temperature (a reactivating temperature for the isocyanate group). Preferred as such blocked isocyanate compounds are those superior in dispersibility when dispersed in water solvent using a surfactant or the like. As examples of commercially available products of these isocyanate compounds there are mentioned products available under the trade name Prominate Series (manufactured by Takeda Chemical Industries, Ltd.). In the case where the use of a small amount of an organic solvent is allowed, it is also possible to use aqueous blocked isocyanates (BI-3, 14, 15, 17, 20) (manufactured by Nippon Polyurethane Industry Co.) which contains an organic solvent such as MEK. The above isocyanates not only react with water-soluble nylon resins on heating and enhance the adhesion, but also are effective in preventing re-dissolving in water which is a drawback of water-soluble resins.

It is preferable that the mixing ratio of the polyamide powder to the isocyanate compound be, in terms of weight ratio, 100 parts by weight of the former: 0.5 to 10 parts by weight of the latter. If the proportion of the isocyanate compound is less than 0.5 part by weight, it is impossible to enhance the adhesion of a polyamide powder or a copolyamide powder to the screw surface of the to-be-coated member when then powder is melted, while if it exceeds 10 parts by weight, there will arise foaming at the time of melting, with consequent likelihood of deterioration in appearance and performance of the coating formed.

In the present invention, for efficiently dispersing the water-insoluble polyamide powder in an aqueous solution in which the water-soluble polyamide is dissolved, there is used the surfactant (c). As the surfactant there may be used a suitable one insofar as the surfactant used does not exert a bad influence on melting of the polyamide power to the screw surface of the to-be-coated member, but a nonionic surfactant is preferred, and more preferred is a polyoxyethylene type nonionic surfactant. Ionic surfactants are apt to be influenced by a change in pH of the aqueous solution and are apt to cause coloration or discoloration when the polyamdie powder is melted.

As examples of commercially available products of the surfactant there are mentioned those available under the trade name Noigen Series (manufactured by Dai-ichi Kogyo Seiyaku Co., Ltd.). A suitable amount of the surfactant is 5 to 20 parts by weight relative to 100 parts by weight of the polyamide powder.

As the water (e) used in the present invention it is preferable to use distilled water, purified water, or ion-exchanged water, but tap water or subterranean water is also employable. Solvents compatible with water, such as alcohols, are also employable in combination with water if the amount thereof is small.

It is preferable that the ingredients of the self-locking agent composition according to the present invention be mixed in approximately the following proportions based on 100 parts by weight of water: 30 to 70 parts by weight (more preferably 40 to 60 parts by weight) of the water-insoluble polyamide powder (a), 0.1 to 20 parts by weight (more preferably 0.5 to 10 parts by weight) of the isocyanate compound (b), 0.5 to 20 parts by weight (more preferably 2 to 10 parts by weight) of the surfactant (c), and 1 to 30 parts by weight (more preferably 5 to 20 parts by weight) of the water-soluble polyamide. By mixing the ingredients of the composition in such proportions there is obtained a dispersion having appropriate viscosity and thixotropy for application to a to-be-coated member such as a screw member.

In the present invention, various additives may be incorporated in the composition according to purposes. For example, for the suppression of foaming of the self-locking agent composition according to the present invention, the addition of a defoaming agent is effective. For the purpose of improving the adhesion to the to-be-coated object there may be added an adhesion imparting agent such as an epoxy resin. Additionally, there also may be added a filler, a colorant, a leveling agent, and a rust preventive.

Reference will be made below to an example of a method for preparing a self-locking agent composition according to the present invention with use of the above ingredients. This method comprises the steps of:
1. adding a surfactant, and a defoaming agent if necessary, into distilled water, followed by stirring for dissolution;
2. adding a polyamide powder into the resulting solution, followed by stirring for dispersion;
3. adding an aqueous solution of a water-soluble polyamide into the resulting dispersion, followed by stirring;
4. adding an aqueous dispersion of an isocyanate compound, followed by stirring; and
5. adding, if necessary, a colorant and a rust preventive, followed by stirring.

The sequence of the above steps is not limited to the above, but plural ingredients may be added and mixed at a time, and the sequence of the above steps may be changed. Anyway, it is particularly preferable that the water-soluble polyamide be used in an early stage as an aqueous solution. Viscosity and thixotropy are eventually adjusted in conformity with the shape and size of the to-be-coated member so as to permit easy application of the resulting dispersion to the to-be-coated member, and there is obtained a dispersion having the so-adjusted viscosity and thixotropy.

If the self-locking agent composition thus prepared is applied to at least a part of a screw surface of a screw member for example, followed by evaporation of water for dryness and subsequent heating and melting, there is obtained a self-locking screw member with polyamide bonded strongly to the to-be-coated member (screw surface). As a pretreatment for the screw surface of the to-be-coated member, it is preferable to perform degreasing washing with use of an aqueous detergent or a petroleum solvent. As the material of the to-be-coated member there may be used not only metals but also other materials insofar as they have heat resistance applicable to melting of the polyamide, such as chromium, zinc, chromate, and nickel plated materials, in addition to iron, copper, brass, and stainless steel.

At the time of applying the self-locking agent composition of the present invention to a screw of M4 or less as a to-be-coated member, it is preferable to adjust the viscosity and thixotropic ratio of the composition to 10 to 200 mPa·s and 1.0 to 3.0, respectively. Such properties of the composition as viscosity and thixotropic ratio are apt to vary depending on the kind and amount of each ingredient contained in the composition and a change in pH value, so it is necessary to make a careful management.

Next, the process for producing the self-locking member according to the present invention will be described step by step. For applying the self-locking agent composition of the present invention to a screw surface of a screw member, there may be used, for example, such an applicator as is disclosed in any of JU (Japanese Utility Model) 62-23567B, 62-23578B, 60-20440B, and 4-27566B. At the time of application of the composition, the to-be-coated member itself may be heated to a temperature of 100° C. or lower. The to-be-coated member is not specially limited insofar as it is made of metal or other heat resistant material and has a screw surface.

It is preferable that the member thus coated with the self-locking agent composition be dried until substantial evaporation of the water contained in the composition. This drying step is carried out at a temperature in the range from room temperature to 120° C., preferably and ideally, until complete evaporation of the water, whereby the foaming of the resin in the heating and melting step can be prevented.

Next, for melting and reaction and adhesion of the self-locking agent composition to the surface of the to-be-coated member, a shift is made to the heating and melting step. In this step, heating is conducted at a temperature in the range of 180° to 300° C. to melt the polyamide powder and make it compatible with the coated member, further allowing it to adhere closely to the surface of the coated member by reaction of the isocyanate compound. More specifically, the heating temperature in this step is determined arbitrarily in consideration of the melting temperature of the polyamide powder used, the dissociation temperature of the isocyanate compound (especially blocked isocyanate), and other conditions. The coated member is then cooled to room temperature, whereby there is produced a self-locking member having a self-locking resin layer formed at the desired portion of the screw surface of the coated member.

The polyamide and the isocyanate compound react with each other by the aforesaid heating to form a crosslinked structure. This crosslinked structure is, for example, an entangled structure between a polyamide structure as a chemical crosslinked structure resulting from reaction of the active hydrogen of polyamide (both water-insoluble and -soluble polyamides) with the isocyanate group and a polymer structure resulting from reaction of the isocyanate compound itself.

It is optional whether the above steps are to be provided each independently or such an applicator as is disclosed, for example, in JU 4-27566B is to be combined with a heater and a cooler for simultaneous execution of the steps from the coating step up to the cooling step through the heating and melting step.

In the case where the to-be-coated member is a screw, the self-locking resin layer formed as above may be present throughout the whole screw surface or may be partially present. The self-locking member according to the present invention is applicable to such various uses as are disclosed in JP 10-288214A, JP 4-20093B, and JP 5-70005B.

Examples of the present invention will be described below.

EXAMPLE 1

80 parts by weight of purified water, 7 parts by weight of a surfactant (Noigen ET-115, a product of Dai-ichi Kogyo Seiyaku Co.), 6 parts by weight of a defoaming agent (Defoamer 5013, a product of Sannopco Co.), 5 parts by weight of a blocked isocyanate (Prominate XC-929C, a product of Takeda Chemical Industries, Ltd., containing 25% of ε-caprolactam blocked diphenylmethane diisocyanate compound), 50 parts by weight of nylon 12 (OLGASOL 2002 UD NAT COS, a product of Elf.Atochem Japan Co., average particle dia. 4 to 6 μm), 50 parts by weight of a 20% aqueous solution of water-soluble nylon (AQ Nylon A-90, a product of Toray Industries, Inc.), and 1.5 parts by weight of a rust preventive (triethanolamine) were mixed together and dispersed to prepare a composition for use as a self-locking agent.

EXAMPLE 2

60 parts by weight of purified water, 0.5 part by weight of a surfactant (Noigen ET-115, a product of Dai-ichi Kogyo Seiyaku Co.), 0.5 part by weight of a defoamer (Defoamer 5013, a product of Sannopco Co.), 20 parts by weight of a blocked isocyanate (Prominate XC-929C, a product of Takeda Chemical Industries, Ltd., containing 25% of $\epsilon$-caprolactam blocked isocyanate compound), 80 parts by weight of nylon 11 (Rirusan Powder D-30, a product of Nippon Rirusan Co., average particle dia. 30 μm), and 50 parts by weight of a 20 aqueous solution of water-soluble nylon (AQ Nylon A-90, a product of Toray Industries, Inc.) were mixed together and dispersed to prepare a composition for use as a self-locking agent.

EXAMPLE 3

110 parts by weight of purified wate4r, 0.5 part by weight of a surfactant (Noigen ET-115, a product of Dai-ichi Kogyo Seiyaku Co.), 0.5 part by weight of a defoamer (Defoamer 5013, a product of Sannopco Co.), 5 parts by weight of a blocked isocyanate (Prominate XC-910, a product of Takeda Chemical Industries, Ltd., containing 44% of MEK oxime blocked tolylene diisocyanate compound), 70 parts by weight of nylon 12 (OLGASOL 2002 UD NAT COS Elf.Atochem Japan Co., average particle dia. 4~6 μm), 50 parts by weight of a 20 aqueous solution of water-soluble nylon (AQ Nylon A-90, a product of Toray Industries, Inc.), and 1.5 part by weight of a rust preventive (triethanolamine) were mixed together and dispersed to prepare a composition for use as a self-locking agent.

COMPARATIVE EXAMPLE 1

100 parts by weight of purified water, 0.5 part by weight of a surfactant (trade name: Noigen ET-115, a product of Dai-ichi Kogyo Seiyaku Co.), 0.5 part by weight of a defoamer (trade name: Defoamer 5013, a product of Sannopco Co.), 20 parts by weight of a blocked isocyanate (trade name: Prominate XC-929C, a product of Takeda Chemical Industries, Ltd., containing 25% of $\epsilon$-caprolactam blocked isocyanate compound), and 50 parts by weight of nylon 12 (Elf.Atochem Japan Co., average particle diameter 4~6 μm) were mixed together and dispersed to prepare a composition for use as a self-locking agent.

COMPARATIVE EXAMPLE 2

50 parts by weight of purified water, 0.5 part by weight of a surfactant (trade name: Noigen ET-115, a product of Dai-ichi Kogyo Seiyaku Co.), 0.5 part by weight of a defoaming agent (trade name: Defoamer, 5013, a product of Sannopco Co.), 20 parts by weight of a blocked isocyanate (trade name: Prominate XC-929C, a product of Takeda Chemical Industries, Ltd., containing 25% of $\epsilon$-caprolactam blocked isocyanate compound), and 100 parts by weight of a 50% aqueous solution of water-soluble nylon (AQ Nylon A-90, a product of Toray Industries, Inc., was dissolved in water beforehand to prepare the aqueous solution) were mixed together and dispersed to prepare a composition for used as a self-locking agent.

[Evaluation Test for Self-locking Effect]

The self-locking agents thus prepared were each applied band-like by dipping throughout the whole circumference of a screw portion of a pan head type machine screw (nickel plated) of M3, then dried at 50° C. for 20 minutes, thereafter heated and melted at 200° C. for 20 minutes, and then allowed to cool, to fabricate self-locking screw members, which were then subjected to an evaluation test. The evaluation test was conducted at n=5 in accordance with JASOF 106-87, in which first-time screwing torques and first- and fifth-time unscrewing torques were measured and mean values were determined. Appearance after melting and peeling of resin after the test were also checked, results of which are shown in Table 1. In the same table, "Variations" indicates the result of having visually checked a change in appearance such as a change in thickness and uniformity of each coating formed on the screw surface. (○ . . . uniform in all the five screw members, Δ . . . slightly non-uniform, X . . . non-uniform in film thickness and great individual difference) "Peeling after test" indicates the result of having visually checked each coating for peeling from the screw surface after the torque test. (○ . . . all the five screw members were free of peeling, Δ . . . slight peeling in one or two screw members, X . . . distinct peeling in four to five screw members)

TABLE 1

|  | Example 1 | Example 2 | Example 3 | Comparative Example 1 | Comparative Example 2 |
|---|---|---|---|---|---|
| 1st Screwing Torque | 0.036~ 0.066N·m Average 0.048N·m σ 0.011 | 0.043~ 0.145N·m Average 0.083N·m σ 0.022 | 0.048~ 0.112N·m Average 0.075N·m σ 0.018 | 0.124~ 0.188N·m Average 0.151N·m σ 0.028 | Measurement impossible due to non-uniform film thickness |
| 1st Unscrewing Torque | 0.039~ 0.073N·m Average 0.052N·m σ 0.013 | 0.019~ 0.139N·m Average 0.067N·m σ 0.030 | 0.049~ 0.115N·m Average 0.077N·m σ 0.028 | 0.128~ 0.200N·m Average 0.161N·m ** | Measurement impossible |
| 5th Unscrewing Torque | 0.024~ 0.044N·m Average 0.031N·m σ 0.009 | 0.019~ 0.115N·m Average 0.059N·m σ 0.032 | 0.035~ 0.070N·m Average 0.045N·m σ 0.027 | Measurement impossible | Measurement impossible |

TABLE 1-continued

|  | Example 1 | Example 2 | Example 3 | Comparative Example 1 | Comparative Example 2 |
|---|---|---|---|---|---|
| 1st Unscrewing Torque/5th Unscrewing Torque x 100 | 65.0% | 70.8% | 60.0% | 0% X | Measurement impossible X |
| Variations | ○ | Δ | ○ | X | X |
| Peeling after test | ○ | Δ | ○ | X** | X |
| Coating Viscosity | 50~100 mPa·s | 50 mPa·s | 100 mPa·s | 400 mPa·s | 160 mPa·s |
| Thixotropic Ratio | 1.5 or more | 1.0 or more | 4 *1 or more | 4 or more | 1.0 or more |

\*\*: Peeling occurred in two screw members out of five
\*1: Many foams in the stock solution As to each of the self-locking agent compositions prepared in Examples 1 and 3, since a polyamide powder of 10 μm or less in particle diameter was dispersed in an aqueous solution of water-soluble nylon, the leveling property of the composition was improved and it became easy to control the coating thickness at the time of application of the coating resin, so that the precision in thickness range of the coating layer (self-locking resin layer) after heat melting and heat reaction was improved. Thus, in case of applying the compositions to a machine screw of a small clearance, they are superior in repeatability and machine screw adaptability as compared with the composition prepared in Example 2 which used a polyamide powder exceeding 10 μm in particle diameter. Thus, the compositions in question are useful in application to, for example, personal computers and portable mobile communication devices using machine screws of M4 or smaller.

Comparative Example 1 corresponds to Example 1 except that the water-soluble nylon was removed from Example 1. With the addition of only such a polyamide powder of 10 μm or less in particle diameter, the viscosity of the composition is apt to become high or the thixotropic ratio thereof is apt to become large, and thus the composition is less stable in its properties. Therefore, when the to-be-coated member is dipped within the composition, variations in thickness of the resulting coating become large and it becomes difficult to control the film thickness. In Comparative Example 1, moreover, two to three screw members out of five exhibited peeling of coating layers during unscrewing torque measurement in Table 1. This is presumed to be because of too large thickness of each coating layer.

Comparative Example 2 corresponds to Example 1 except that the polyamide powder of 10 μm or less in particle diameter was removed from Example 1. In the self-locking agent composition prepared in Comparative Example 1, when applied to each to-be-coated member by dipping, the coating resin layer becomes too thick and is apt to peel off due to a too high viscosity of the composition. In an effort to avoid this inconvenience, if the composition is diluted to lower its viscosity and is then used, there will occur sagging, with the result that the film thickness becomes insufficient or it is impossible to form a desired shape of a coating layer.

[Effect of the Invention]

The self-locking composition according to the present invention uses water as solvent and basically contains little organic solvent and so scarcely exerts any bad influence on the environment and the human body. Besides, in comparison with a self-locking agent composition using an organic solvent, a leveling property is exhibited when the composition is applied to a screw surface, and since sagging is difficult to occur during heating and melting, it is easy to control the thickness and formation range of a coating resin layer (self-locking agent layer). Moreover, the production cost can be kept low because it is not necessary to install a local exhaust equipment or an explosion-proof equipment.

Particularly, in a system using a polyamide powder of 10 μm or less in particle diameter, the leveling property is further improved and it becomes easier to control the coating thickness at the time of application of a coating resin, resulting in that the precision in controlling the coating thickness and coating formation range after heat melting and heat reaction is further improved. Further, since the surface smoothness of the coating layer is improved to a greater extent, not only the performance as a self-locking member is improved and variations caused by individual difference are diminished. Thus, the self-locking member using the composition of the invention is superior in repeated employability and machine screw adaptability and is therefore useful particularly for personal computers and portable mobile communication devices using machine screws of M4 or less.

Additionally, also when applied to a screw surface of a to-be-coated member, the self-locking agent composition of the present invention exhibits a relatively early volatility of water solvent, i.e., drying characteristic, and is thus superior in mass-productivity. In the case where a rust preventive is contained in the composition, it is possible to prevent corrosion of a metallic surface of a to-be-coated member. In this case, if triethanolamine is used as the rust preventive, it is possible to prevent the occurrence of an offensive smell in the drying process.

What is claimed is:

1. A composition for use as a self-locking agent, comprising an aqueous dispersion, said aqueous dispersion comprising the following ingredients (a) to (d) each of which is either dissolved or dispersed in water in the following proportions based on 100 parts by weight water:
    (a) 30 to 70 parts by weight of a water-insoluble polyamide powder;
    (b) 0.1 to 20 parts by weight of an isocyanate compound;
    (c) 0.5 to 20 parts by weight of a surfactant; and
    (d) 1 to 30 parts by weight of a water-soluble polyamide.

2. A composition for use as a self-locking agent according to claim 1, wherein said water insoluble polyamide powder (a) has a particle diameter of 10 μm or less.

3. A composition for use as a self-locking agent according to claim 1, wherein said water-insoluble polyamide powder (a) is a powder of at least one polyamide selected from nylon 11, nylon 12, and copolymers thereof.

4. A composition for use as a self-locking agent according to claim 2, wherein said water-insoluble polyamide powder (a) is a powder of at least one polyamide selected from nylon 11, nylon 12, and copolymers thereof.

5. A composition for use as a self-locking agent according to claim 1, wherein said isocyanate compound (b) is a blocked isocyanate compound wherein the isocyanate group is masked.

6. A composition for use as a self-locking agent according to claim 2, wherein said isocyanate compound (b) is a blocked isocyanate compound wherein the isocyanate group is masked.

7. A composition for use as a self-locking agent according to claim 3, wherein said isocyanate compound (b) is a blocked isocyanate compound wherein the isocyanate group is masked.

8. A composition for use as a self-locking agent according to claim 1, wherein said surfactant (c) is a nonionic surfactant.

9. A composition for use as a self-locking agent according to claim 2, wherein said surfactant (c) is a nonionic surfactant.

10. A composition for use as a self-locking agent according to claim 3, wherein said surfactant (c) is a nonionic surfactant.

11. A composition for use as a self-locking agent according to claim 5, wherein said surfactant (c) is a nonionic surfactant.

12. A composition for use as a self-locking agent according to claim 8, wherein said surfactant (c) is a polyoxyethylene type nonionic surfactant.

13. A composition for use as a self-locking agent according to claim 1, wherein said water-soluble polyamide (d) is a modified polyamide having a water-soluble functional group in the molecule.

14. A composition for use as a self-locking agent according to claim 2, wherein said water-soluble polyamide (d) is a modified polyamide having a water-soluble functional group in the molecule.

15. A composition for use as a self-locking agent according to claim 3, wherein said water-soluble polyamide (d) is a modified polyamide having a water-soluble functional group in the molecule.

16. A composition for use as a self-locking agent according to claim 5, wherein a blocking agent for masking the isocyanate group in said isocyanate compound (b) is a compound selected from the group consisting of phenols and oximes.

17. A composition for use as a self-locking agent according to claim 1, wherein said aqueous dispersion is prepared by dissolving and/or dispersing said water-insoluble polyamide powder (a), said isocyanate compounds (b) and said surfactant (c) in an aqueous solution of said water-soluble polyamide (d).

18. A self-locking member characterized in that the composition for use as a self-locking agent described in claim 1 is applied to at least a part of a screw surface of a locking member, followed by heat treatment, to form a resin layer on said screw surface at least partially.

19. A self-locking member according to claim 18, which is a screw or nut each having a diameter of 4 mm or less.

* * * * *